United States Patent
Chen et al.

(10) Patent No.: US 7,088,580 B2
(45) Date of Patent: Aug. 8, 2006

(54) MOUNTING APPARATUS FOR DATA STORAGE DEVICE

(75) Inventors: Yun Lung Chen, Tu-Chen (TW); Ding Ling, Shenzhen (CN); Zhou Xu, Shenzhen (CN)

(73) Assignees: Hong Fu Jin Precision IND (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 119 days.

(21) Appl. No.: 10/950,322

(22) Filed: Sep. 23, 2004

(65) Prior Publication Data

US 2005/0068721 A1   Mar. 31, 2005

(30) Foreign Application Priority Data

Sep. 30, 2003   (TW) .............................. 92217522 U

(51) Int. Cl.
 *G06F 1/16* (2006.01)
(52) U.S. Cl. ..................... 361/685; 312/223.1
(58) Field of Classification Search ................ 361/685; 312/223.1, 223.2
See application file for complete search history.

(56) References Cited

U.S. PATENT DOCUMENTS

| | | | | |
|---|---|---|---|---|
| 4,941,841 A | * | 7/1990 | Darden et al. | 361/685 |
| 6,305,660 B1 | * | 10/2001 | Liao | 361/685 |
| 6,667,880 B1 | * | 12/2003 | Liu et al. | 361/685 |
| 6,813,148 B1 | * | 11/2004 | Hsu et al. | 361/685 |

FOREIGN PATENT DOCUMENTS

CN    98235030.9    11/1999

* cited by examiner

*Primary Examiner*—Lisa Lea-Edmonds
(74) *Attorney, Agent, or Firm*—Wei Te Chung

(57) ABSTRACT

A mounting apparatus for mounting a data storage device (10) includes a drive bracket (30), and a locking device (40) movably attached to the drive bracket via a screw (50). The data storage device forms a pair of studs (20) at each opposite side plate thereof. The drive bracket includes a first side wall (302) and a second side wall (304) respectively defining first and second guiding grooves (3022,3042) thereof. The first side wall defines a locking hole (3027) beside an end of the first guiding groove. The locking device comprises a position slot (405) for fastening a corresponding stud therein, and a locking tab (4046) engaging in the locking hole of the drive bracket for locking the data storage device in the drive bracket.

19 Claims, 5 Drawing Sheets

MOUNTING APPARATUS FOR DATA STORAGE DEVICE

BACKGROUND OF THE INVENTION

1. Field of the Invention

The present invention relates to a mounting apparatus for data storage device, and particularly to a mounting apparatus for readily attaching a data storage device to a computer enclosure.

2. Description of the Related Art

A number of different means and devices are used to mount data storage devices to a drive bracket of a computer enclosure. These data storage devices include, for example, hard disk drives (HDDs), floppy disk drives (FDDs), and compact disk read only memory (CD-ROM) drives. An old conventional means is to directly screw the data storage devices to the drive bracket. An example of this means is disclosed in Taiwan patent application No. 87204479. However, the device disclosed requires a number of screws, which is unduly cumbersome and time-consuming.

An improved means to overcome the above shortcomings is to have a pair of guide rails attached to opposite side walls of the bracket. A pair of sliding rails is then attached to opposite sides of the data storage device, for sliding in the guide rails of the bracket. Thus, the data storage device can be readily slid into and secured to the bracket. An example of this means is disclosed in China patent application No. 98235030.9. However, this solution is still required to attach the slide rails to the data storage device by a plurality of screws.

Thus, a mounting apparatus for a data storage device which solves the above-mentioned problems is strongly desired.

SUMMARY OF THE INVENTION

Accordingly, an object of the present invention is to provide a mounting apparatus which readily allows attachment and removal of a data storage device to and from an enclosure.

To achieve the above-mentioned object, a mounting apparatus in accordance with a preferred embodiment of the present invention is adapted to mount a data storage device having a pair of studs on each side plate thereof. The mounting apparatus comprises a drive bracket, a locking device, and a screw. The drive bracket comprises a pair of opposite first and second side walls, the side walls respectively defines first and second guiding grooves thereof, the first side wall forms a bulge with a receiving slot extending vertically thereon, and a locking hole is defined adjacent to the bulge. The locking device defines a position slot for fastening a corresponding stud therein, a locking tab extending from the locking device for engaging with the locking hole in the drive bracket. The screw extends through the receiving slot of the first side wall and engages in the screw hole for attaching the locking device to the drive bracket.

In assembly, the studs of the data storage device slide along the corresponding guiding grooves of the drive bracket, one of the studs enters the position slot, and the locking tab slides into the locking hole of the drive bracket. Therefore, the data storage device is secured to the drive bracket. In disassembly, the locking tab is outwardly pulled to disengage from the locking hole of the bracket, then the data storage device is draw out.

In this invention, the locking device is secured to the drive bracket with only one screw, the data storage device is received in the drive bracket with the stud engaging in the position slot of the locking device, that is say, the data storage device is secured to the drive bracket without screws, whereupon simplifies the attachment and removing procedure.

Other objects, advantages and novel features of the present invention will be drawn from the following detailed description of a preferred embodiment of the present invention with attached drawings, in which:

DETAILED DESCRIPTION OF THE INVENTION

Figure 1:
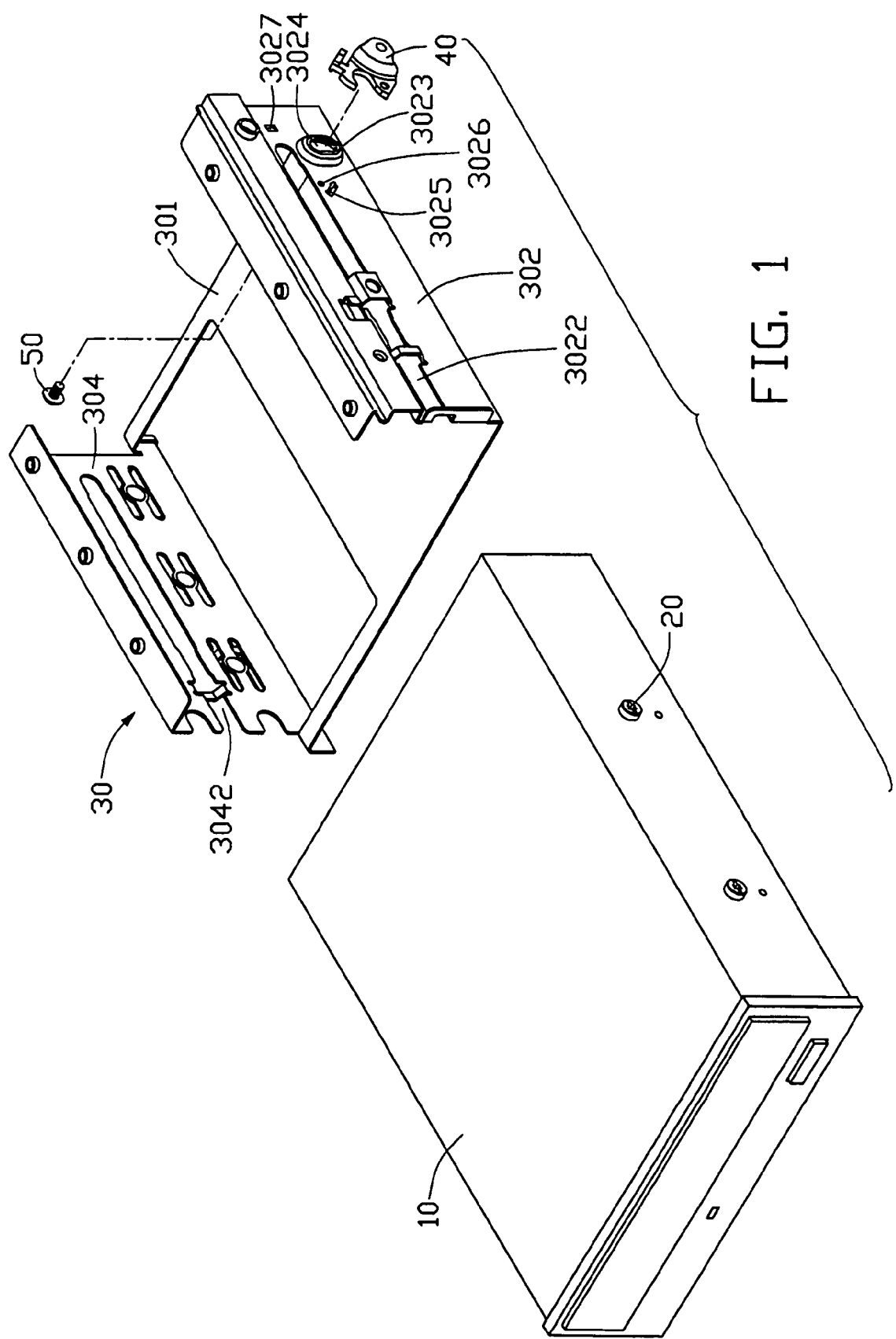
FIG. 1 is an exploded, isometric view of a mounting apparatus in accordance with the present invention, together with a data storage device, the mounting apparatus comprising a drive bracket and a locking device.
Figure 2:
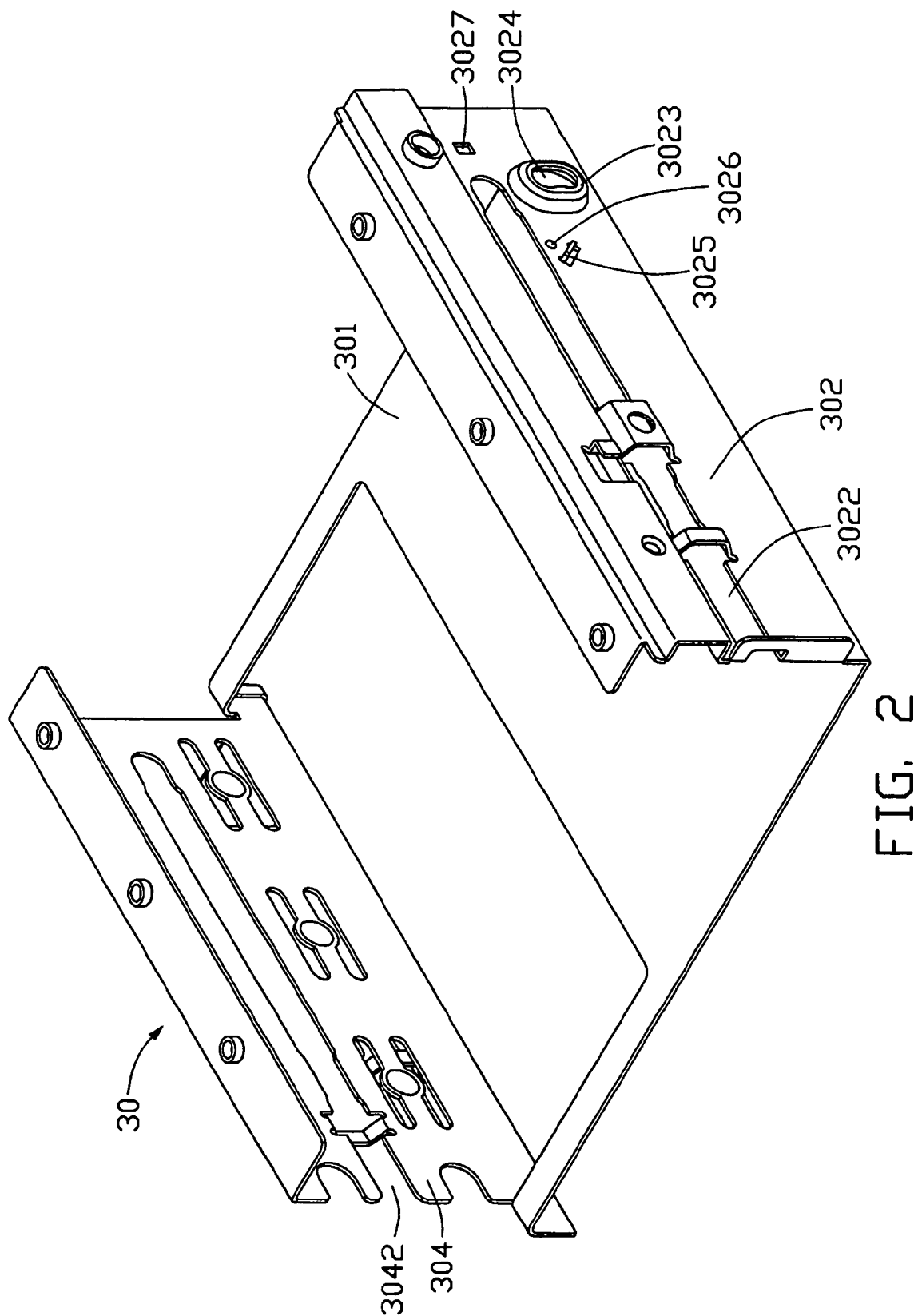
FIG. 2 is an isometric view of the drive bracket of FIG. 1.

Referring to FIGS. 1–2, a mounting apparatus in accordance with the preferred embodiment of the present invention is used for securing a data storage device 10. The mounting apparatus together with the data storage device 10 is secured to a computer chassis (not shown). The mounting apparatus comprises a drive bracket 30, a locking device 40, and a screw 50.

A pair of studs 20 is screwed to each side plate of the data storage device 10.

The drive bracket 30 comprises a bottom wall 301, and first and second upward side walls 302, 304 extending from opposite edges of the bottom wall 301. The side walls 302, 304 each define a first and a second guiding groove 3022, 3042 paralleling the bottom wall 301. Under an end of the guiding groove 3022 a bulge 3023 is stamped outwardly from the first side wall 302. An arc-shaped receiving slot 3024 is vertically defined in a center of the bulge 38. A baffle 3025 and a boss 3026 are formed on the first side wall 302 at the left side of the bulge 3023 and under the first groove 3022 with the boss 3026 between the baffle 3025 and the bulge 3023. A locking hole 3027 is defined adjacent to the end of the first groove 3022.

Figure 3A:
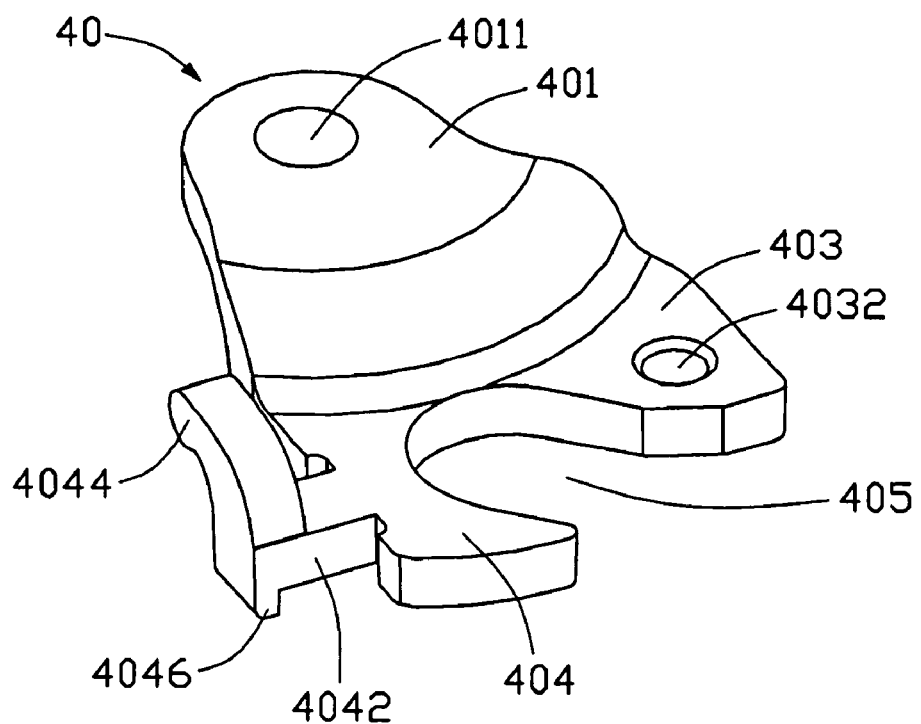
FIG. 3A is an isometric view of the locking device of FIG. 1.
Figure 3B:
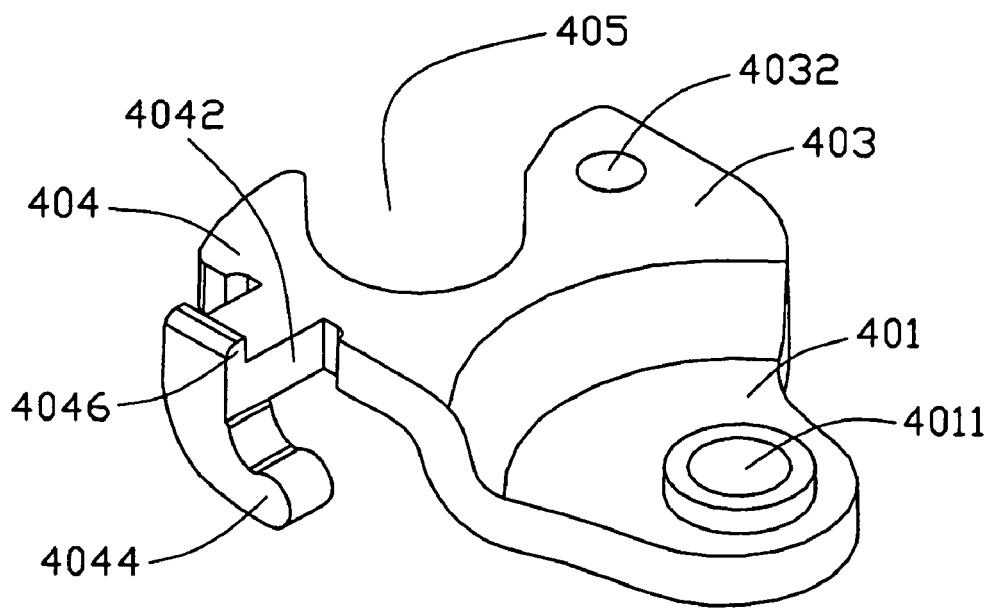
FIG. 3B is similar to FIG. 3A, but viewed from another aspect.
Figure 4:
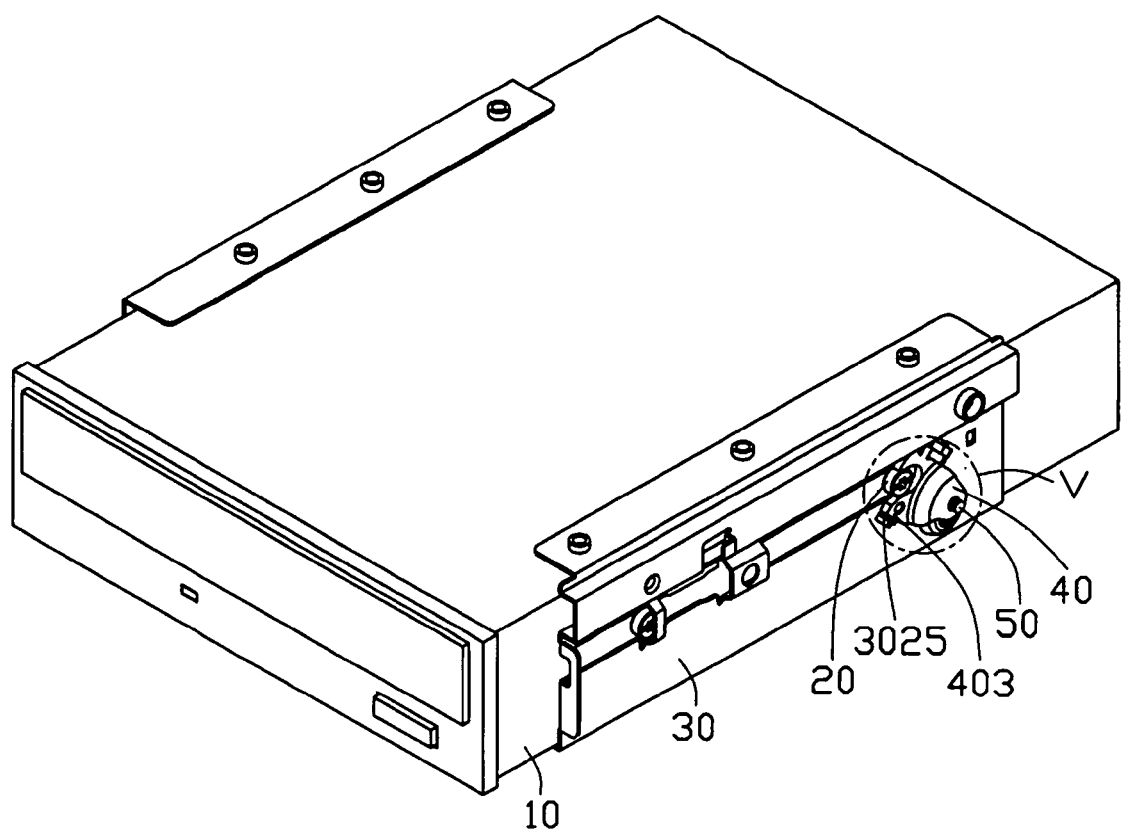
FIG. 4 a pre-assembled view of FIG. 1, with the locking device in a locking position.
Figure 5:
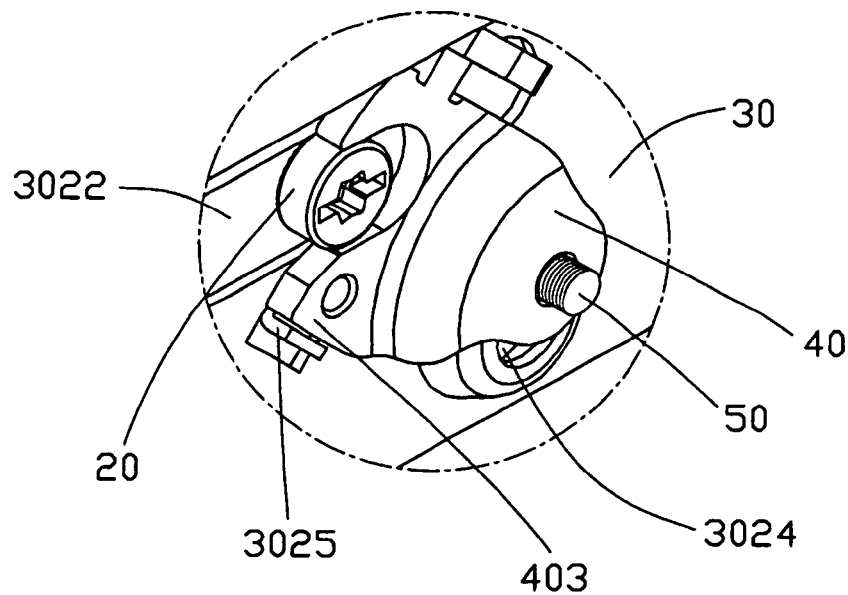
FIG. 5 is an enlarged view of a circled portion of FIG. 4.
Figure 6:
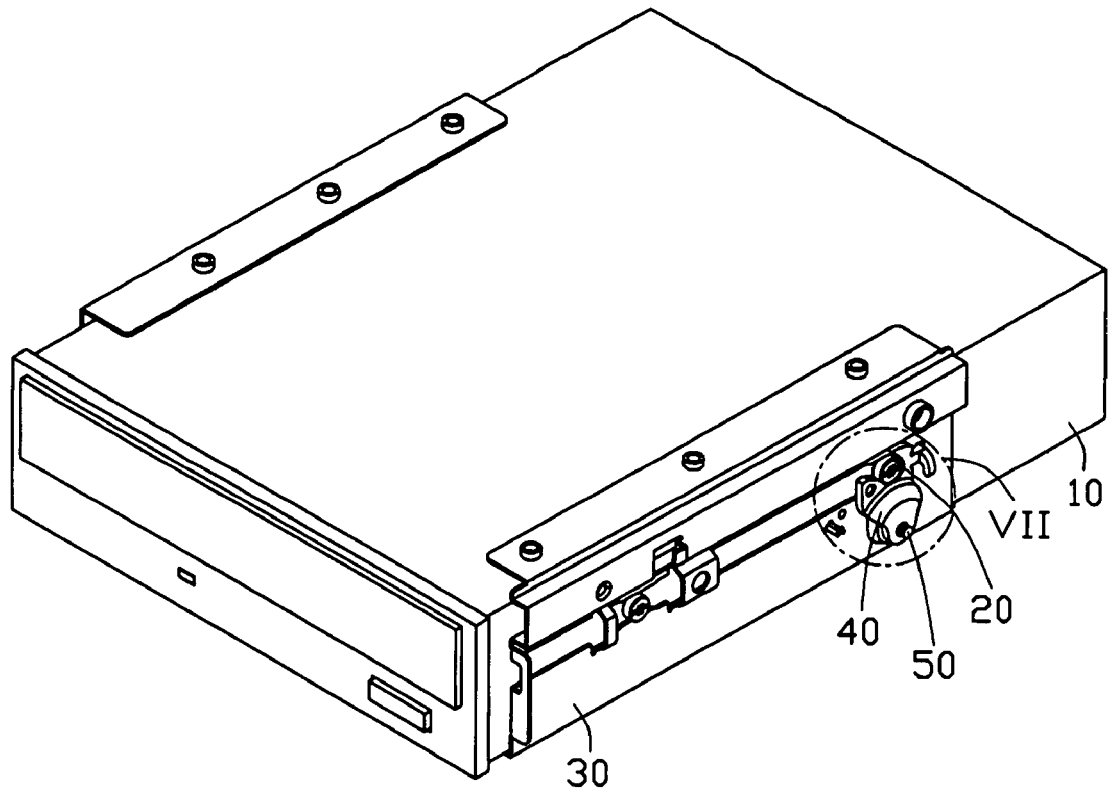
FIG. 6 is an assembled view of FIG. 1.
Figure 7:
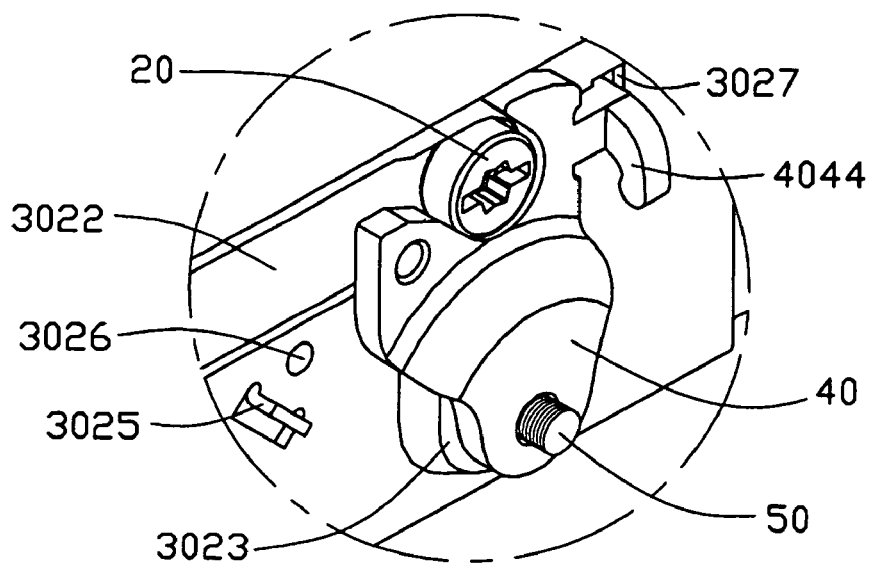
FIG. 7 is an enlarged view of an encircled portion VII of FIG. 6.

Referring to FIGS. 3–4, the locking device 40 comprises a sector-shaped main portion 401, a positioning portion 403 and a fastening portion 404 extending outwardly from an edge of the main portion 401. The main portion 401 defines a through hole 4011 for the screw 50 extending therein for attaching the locking device 40 to the drive bracket 30. An arc shape position slot 405 is defined in the fastening portion 404 to receive the stud 20 therein. The positioning portion 403 defines a position hole 4032 therein corresponding to the boss 3026 of the drive bracket 30. A connection arm 4042 extends from a center of the fastening portion 404, and a handle 4044 vertically extends from the connection arm 4042. A locking tab 4046 is formed from an end of the handle 4044 corresponding to the locking hole 3027 of the drive bracket 30.

Referring to FIGS. 4–7, in assembly, the locking device 40 is attached to the first side wall 302 by the screw 50 which extends through the receiving slot 3024 of the first side wall 302 and engages with the screw hole 4011. The locking device 40 abuts against the first side wall 302. The locking device 40 is rotated so that the boss 3026 of the drive bracket 30 engages in the position hole 4032 of the locking device 40. In this position, an edge of the positioning portion 403 abuts against the baffle 3025. The screw 50 is at the top of the receiving slot 3024. The entrance of the position slot 405 is aligned with the first guiding grooves 3022 of the drive bracket 30.

Then, the studs 20 are respectively slid along the corresponding first and second guiding grooves 3022, 3042, by the data storage device 10 being further pushed, one of the studs 20 enters into the position slot 405 and pushes the locking device 40 to rotate. The locking device 40 is thereby rotated around the screw 50, the boss 3026 leaves the position hole 4032, the screw 50 moves downwardly in the receiving slot 3024. Then the locking tab 4046 slides into the locking hole 3027 of the drive bracket 30, and the stud 20 is limited in the position slot 405 of the locking device 40, therefore, the data storage device 10 is secured to the drive bracket 30.

In disassembly, the handle 4044 is pulled outwardly to cause the locking tab 4046 to disengage from the locking hole 3027 of the drive bracket 30, then draw out the data storage device 10 so that the data storage device 10 is removed from the drive bracket 30.

It is understood that the invention may be embodied in other forms without departing from the spirit thereof. Thus, the present example and embodiment is to be considered in all respects as illustrative and not restrictive, and the invention is not to be limited to the details given herein.

What is claimed:

1. A mounting apparatus for a data storage device having a pair of studs on each side wall thereof, the mounting apparatus comprising:
   a drive bracket comprising a pair of opposite first and second side walls, the side walls respectively defining first and second guiding grooves therein for slidably receiving the studs of the data storage device, the first side wall forming a bulge with a receiving slot extending vertically thereon, a locking hole defined adjacent to the bulge;
   a locking device defining a position slot for fastening one of the studs therein, a locking tab extending from the locking device for engaging with the locking hole on the drive bracket; and
   a screw extending through the receiving slot of the first side wall and engaging with the locking device, thereby the locking device pivotably and slideably attached to the drive bracket.

2. The mounting apparatus as described in claim 1, wherein the bulge is formed under an end of the first groove of the first side wall.

3. The mounting apparatus as described in claim 1, wherein a baffle is formed at the first side wall adjacent to the bulge, and wherein when the locking device is positioned by the baffle, the position slot is in alignment with the first guiding slot of the first side wall for entry of said one of the studs.

4. The mounting apparatus as described in claim 3, wherein a boss is formed between the bulge and the baffle on the first side wall.

5. The mounting apparatus as described in claim 4, wherein the locking device defines a locking hole engaging with the boss of the drive bracket.

6. The mounting apparatus as described in claim 1, wherein the receiving slot of the bulge is generally arc-shaped.

7. The mounting apparatus as described in claim 1, wherein the locking device comprises a handle.

8. The mounting apparatus as described in claim 1, wherein the position slot is generally arc-shaped.

9. A mounting apparatus comprising:
   a data storage device having a pair of studs secured to side plates thereof;
   a drive bracket adapted for accommodating said data storage device, the drive bracket comprising a first side wall and a second side wall respectively defining first and second guiding grooves therein, the first side wall defining a locking hole beside an end of the first guiding groove and a boss under the first guiding groove; and
   a locking device pivotably and slideably attached to the first side wall via a screw, the locking device comprising a position slot engaging with one of the studs, a locking tab, and a position hole engaging with the boss;
   wherein the locking device rotates between a first position in which the boss engages in the position hole and the position slot in alignment with the first guiding groove for entry of a corresponding stud, and a second position in which said corresponding stud is restrictedly received in the position slot and the locking tab engages in the locking hole of the drive bracket.

10. The mounting apparatus as described in claim 9, wherein a bulge is stamped under an end of the guiding groove on the first side wall.

11. The mounting apparatus as described in claim 10, wherein a receiving slot is vertically defined in the bulge.

12. The mounting apparatus as described in claim 11, wherein the locking device defines a through hole corresponding to the receiving slot of the drive bracket, the screw extends into the through hole and the receiving slot to attach the locking device to the drive bracket.

13. The mounting apparatus as described in claim 12, wherein the through hole has a threaded inner surface.

14. A mounting apparatus assembly comprising:
   a data storage device having at least one stud on one of two opposite side walls thereof;
   a drive bracket comprising a pair of opposite first and second side walls, one of said side walls respectively defining a guiding groove therein for slidably receiving the stud of the data storage device; and
   a locking device mounted to said one of the two side walls and being rotatable about a rotation axis extending in a direction perpendicular to said one of the side walls, said locking device defining a position section for releasably fastening said one stud therein, a locking tab extending from the locking device for retaining the locking tab in a locking position.

15. The mounting apparatus assembly as claimed in claim 14, wherein said rotation axis is smoothly moveable so that the locking device is essentially moved in a hybrid type path derived from at least rotation plus other movements.

16. The mounting apparatus assembly as claimed in claim 15, wherein said rotation axis is linearly moved.

17. The mounting apparatus assembly as claimed in claim 16, wherein said rotation axis is vertically moved.

18. The mounting apparatus assembly as claimed in claim 15, wherein said position section is able to be configured and dimensioned to substantially snugly receive the stud therein due to the hybrid type path of movement of the locking device.

19. The mounting apparatus assembly as claimed in claim 18, wherein the locking device can be activated by confrontation of the stud and the position slot to move the locking device from an unlocking position to the locking position.

* * * * *